United States Patent
Oka

(10) Patent No.: US 11,138,783 B2
(45) Date of Patent: Oct. 5, 2021

(54) IMAGE PROCESSING APPARATUS, IMAGE PROCESSING METHOD, AND IMAGE PRODESSING PROGRAM FOR ALIGNING A POLYGON MODEL WITH A TEXTURE MODEL

(71) Applicant: Sony Computer Entertainment Inc., Tokyo (JP)

(72) Inventor: Masaaki Oka, Kanagawa (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 842 days.

(21) Appl. No.: 14/830,133

(22) Filed: Aug. 19, 2015

(65) Prior Publication Data

US 2016/0125646 A1     May 5, 2016

(30) Foreign Application Priority Data

Oct. 30, 2014   (JP) .............................. JP2014-221998

(51) Int. Cl.
    *G06T 15/04* (2011.01)
    *G06T 17/20* (2006.01)
    *G06T 19/20* (2011.01)

(52) U.S. Cl.
    CPC .............. *G06T 15/04* (2013.01); *G06T 17/20* (2013.01); *G06T 19/20* (2013.01); *G06T 2219/2021* (2013.01)

(58) Field of Classification Search
    None
    See application file for complete search history.

(56) References Cited

U.S. PATENT DOCUMENTS

2002/0050988 A1* 5/2002 Petrov .................. G06K 9/20
                                                      345/418
2006/0285758 A1* 12/2006 Marugame .............. G06T 9/001
                                                      382/236

FOREIGN PATENT DOCUMENTS

WO        2005/024728      3/2005

OTHER PUBLICATIONS

Sato, Hajime, Jun Ohya, and Nobuyoshi Terashima. "Realistic 3D facial animation using parameter-based deformation and texture remapping." Automatic Face and Gesture Recognition, 2004. Proceedings. Sixth IEEE International Conference on. IEEE, 2004.*

(Continued)

*Primary Examiner* — Sarah Le
(74) *Attorney, Agent, or Firm* — Katten Muchin Rosenman LLP

(57) ABSTRACT

There is provided an image processing apparatus including: an image information acquiring part configured to acquire two-dimensional image information including a texture image; a polygon model information acquiring part configured to acquire polygon model information representing a three-dimensional polygon model as an object on which to map the texture image, the polygon model information including position information about a plurality of vertexes; a polygon model information updating part configured to update the position information about at least one and other vertexes included in the polygon model information, on the basis of predetermined relations reflecting vertex movement information representing the movement of at least one of the vertexes; and a mapping part configured to map the texture image on the polygon model based on the updated polygon model information.

8 Claims, 9 Drawing Sheets

(56) References Cited

OTHER PUBLICATIONS

Suzuki, Hiromasa, et al. "Interactive mesh dragging with an adaptive remeshing technique." The Visual Computer 16.3-4 (2000): 159-176.*
Japanese Notification of Reason for Refusal dated Aug. 16, 2016 from corresponding Application No. 2014-221998.
Hajime Sato, Et. Al., "3 dimensional Human Face Image Reconstruction Using Shape Deformation Based on Facial Muscle Movement and Texture Remapping", Journal of the Institute of Electronics, Information and Communication Engineers (J88-D-II), Incorporated Association Institute of Electronics, Information and Communication Engineers, Jul. 1, 2005, Issue 7, p. 1126-1142.

* cited by examiner

IMAGE PROCESSING APPARATUS, IMAGE PROCESSING METHOD, AND IMAGE PRODESSING PROGRAM FOR ALIGNING A POLYGON MODEL WITH A TEXTURE MODEL

BACKGROUND

The present disclosure relates to an image processing apparatus, an image processing method, and an image processing program.

In the field of computer graphics and related technology, there is generally known the technique of mapping a two-dimensional texture image on the surface of a three-dimensional object formed by a three-dimensional polygon model.

SUMMARY

For example, suppose that an image of a differently shaped stuffed toy (texture image) is to be mapped on a three-dimensional polygon model representing a stuffed toy (polygon model). In this case, a wire model of the polygon model (i.e., a model representing the polygon model using vertexes and sides) displayed on the stuffed toy image may be contracted or enlarged. At the same time, the wire model of the polygon model may be moved for approximate alignment between the wire model and the texture model. Thereafter, in view of the difference in shape between the texture image and the polygon model, the vertexes of the wire model may be moved for further alignment between the texture image and the wire model.

In the case above, however, there may well be numerous vertexes to be aligned. This makes the alignment difficult to achieve. It may also take an extended period of time to perform alignment procedures.

The present disclosure has been made in view of the above circumstances and provides an image processing apparatus and related technology capable of aligning a texture image with a polygon model easily and quickly.

In carrying out the present disclosure and according to one embodiment thereof, there is provided an image processing apparatus including: an image information acquiring part configured to acquire two-dimensional image information including a texture image; a polygon model information acquiring part configured to acquire polygon model information representing a three-dimensional polygon model as an object on which to map the texture image, the polygon model information including position information about a plurality of vertexes; a polygon model information updating part configured to update the position information about at least one and other vertexes included in the polygon model information, on the basis of predetermined relations reflecting vertex movement information representing the movement of at least one of the vertexes; and a mapping part configured to map the texture image on the polygon model based on the updated polygon model information.

Preferably in the image processing apparatus, the predetermined relations may reflect a spring model having a virtual spring provided for each of the sides connecting the vertexes. The image processing apparatus may further include a physical simulation part configured to perform physical simulation based on the spring model and on the vertex movement information.

Preferably, the information processing apparatus may further include a spring model updating part configured to update the natural length of each of the springs at a predetermined timing.

Preferably, the information processing apparatus may further include a superposed image information generating part configured to generate superposed image information for displaying a wire model representing the vertexes and the sides of the polygon model in a manner superposed on the image information, on the basis of the polygon model information.

Preferably in the information processing apparatus, the superposed image information generating part may generate the superposed image information for displaying in a superposed manner the wire model representing a portion of the vertexes and of the sides included in the polygon model.

Preferably in the information processing apparatus, the physical simulation part may perform the physical simulation using the portion of the vertexes and of the sides.

According to another embodiment of the present disclosure, there is provided an image processing method including: acquiring two-dimensional image information including a texture image; acquiring polygon model information representing a three-dimensional polygon model as an object on which to map the texture image, the polygon model information including position information about a plurality of vertexes; updating the position information about at least one and other vertexes included in the polygon model information, on the basis of predetermined relations reflecting vertex movement information representing the movement of at least one of the vertexes; and mapping the texture image on the polygon model based on the updated polygon model information.

According to a further embodiment of the present disclosure, there is provided an image processing program for causing a computer to function as an apparatus including: an image information acquiring part configured to acquire two-dimensional image information including a texture image; a polygon model information acquiring part configured to acquire polygon model information representing a three-dimensional polygon model as an object on which to map the texture image, the polygon model information including position information about a plurality of vertexes; a polygon model information updating part configured to update the position information about at least one and other vertexes included in the polygon model information, on the basis of predetermined relations reflecting vertex movement information representing the movement of at least one of the vertexes; and a mapping part configured to map the texture image on the polygon model based on the updated polygon model information.

DETAILED DESCRIPTION OF THE PREFERRED EMBODIMENTS

Figure 1:
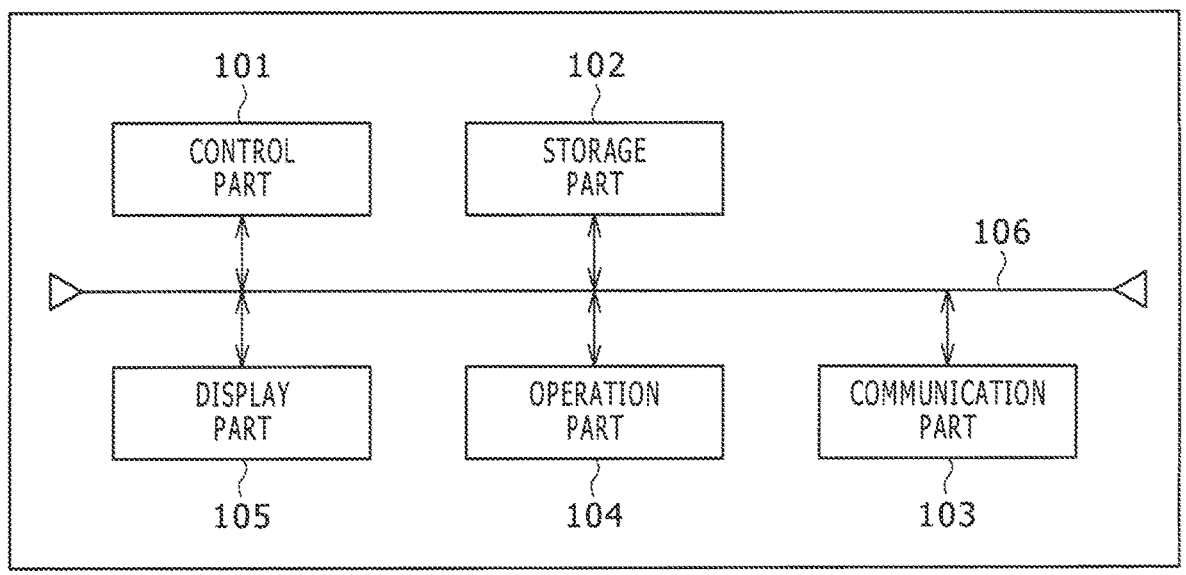
FIG. 1 is a diagram outlining a typical structure of an image processing apparatus as a first embodiment of the present disclosure.

Some preferred embodiments of the present disclosure are explained below with reference to the accompanying drawings. Throughout the drawings, like reference numerals designate like or corresponding parts, and their explanations will be omitted where redundant.

First Embodiment

FIG. 1 is an explanatory diagram outlining a typical structure of an image processing apparatus 100 as the first embodiment of the present disclosure. As shown in FIG. 1, the image processing apparatus 100 as the first embodiment is composed of a computer that includes a CPU (Central processing unit), memory, and other parts. For example, the image processing apparatus 100 includes a control part 101, a storage part 102, a communication part 103, an operation part 104, and a display part 105. The control part 101, storage part 102, communication part 103, operation part 104, and display part 105 are interconnected with one another by an internal bus 106.

For example, the control part 101 may be the CPU or an MPU (Micro processing unit) that functions in accordance with programs stored in the storage part 102. The storage part 102 may be formed by a ROM (Read only memory), a RAM (Random access memory), a hard disk, or some other information recording medium. As such, the storage part 102 is an information recording medium that retains the programs to be executed by the control part 101. The storage part 102 also functions as a work memory for the control part 101. The programs may be offered downloaded over a network or held on diverse computer-readable information recording media including CD (Compact disk)-ROMs and DVD (Digital versatile disk)-ROMs.

The communication part 103 connects the image processing apparatus 100 with other information processing apparatuses, databases, and other entities (not shown). The operation part 104 is made up of a keyboard, a mouse and a controller, for example. Given a user's instruction operations, the control part 104 outputs the specifics of the instruction operations to the control part 101. The display part 105 may be a liquid crystal display, an organic EL (Electroluminescence) display, or some other type of display that displays information in accordance with the instructions from the control part 101.

It should be noted that the above-described structure of the information processing apparatus 100 is only an example and is not limitative of the apparatus 100. For example, the information processing apparatus 100 may be constituted by a server-client system, by cloud technology, some other suitable technology. As another example, the information processing apparatus 100 may be equipped with a camera to acquire image information taken by the camera.

Figure 2:
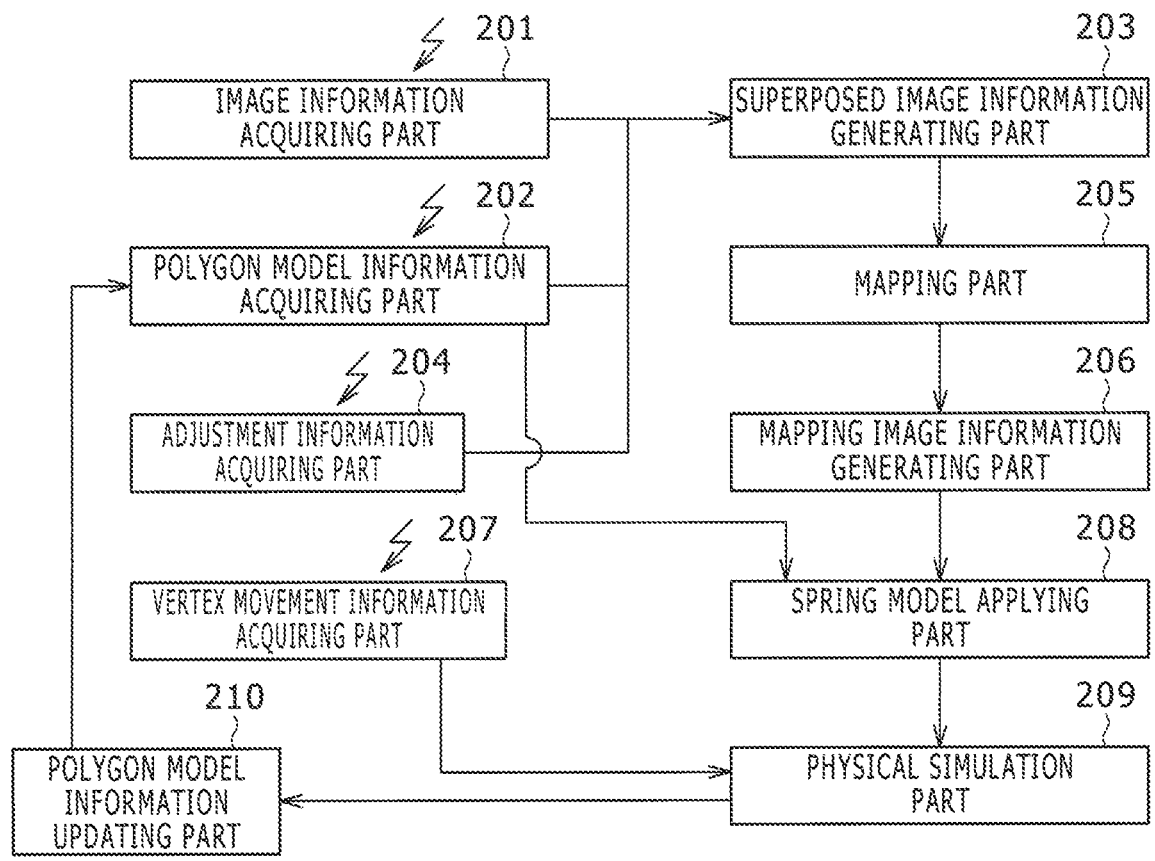
FIG. 2 is a diagram outlining a typical functional structure of the image processing apparatus.

FIG. 2 is an explanatory diagram outlining a typical functional structure of the image processing apparatus 100. In functional terms, as shown in FIG. 2, the control part 101 of the image processing apparatus 100 may include an image information acquiring part 201, a polygon model information acquiring part 202, a superposed image information generating part 203, an adjustment information acquiring part 204, a mapping part 205, a mapping image information generating part 206, a vertex movement information acquiring part 207, a spring model applying part 208, a physical simulation part 209, and a polygon model information updating part 210, for example.

Figure 3A:
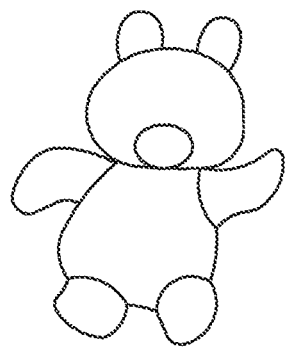
FIG. 3A is a diagram showing a typical polygon model.
Figure 3B:
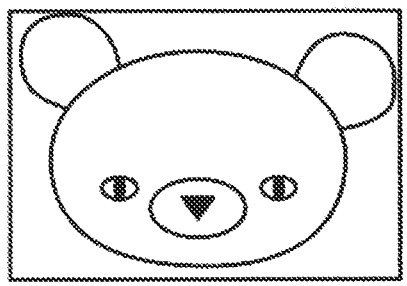
FIG. 3B is a diagram showing a typical texture image.
Figure 3C:
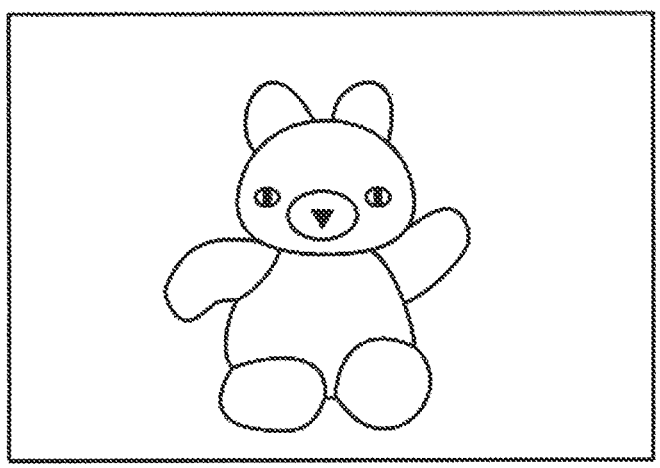
FIG. 3C is a diagram showing a typical mapping image on which a texture image is mapped.

For a better understanding of the ensuing description, it is assumed that the face image of a stuffed toy image (texture image) shown in FIG. 3B is to be mapped on the face portion of the polygon model representative of the stuffed toy shown in FIG. 3A, in such a manner that the feature points of the stuffed toy such as the eyes and nose are positioned properly where they should be as indicated in FIG. 3C. Although the explanation in reference to FIGS. 3A through 3C deals with the case in which the texture model representing the face of the stuffed toy image is mapped on a portion of the polygon model (i.e., face portion), obviously a texture image of the polygon model as a whole may also be mapped on the entire polygon model.

Explained below is a typical functional structure of the control part 101 in the image processing apparatus 100 for carrying out an adjusting process by which a wire model 401 is enlarged or contracted in size for alignment between the texture image and the wire model 401 in position and size. In the case of FIGS. 3A through 3C, the wire model 401 corresponds to the face portion of the polygon model representative of the stuffed toy shown in FIG. 3A.

The image information acquiring part 201 acquires two-dimensional image information including the texture image to be mapped on a polygon model. The image information may be obtained by the user using a camera. Alternatively, some suitable existing image information may be utilized. Also, the image information may be information stored beforehand in the image processing apparatus 100, or may be information acquired from the outside over a network or by some other suitable means. Obviously, besides these examples, some other suitable image information may be utilized instead.

The polygon model information acquiring part 202 acquires polygon model information representative of a polygon model. Here, the polygon model information includes position information about multiple vertexes and information about the sides making up the polygon model.

Figure 4:
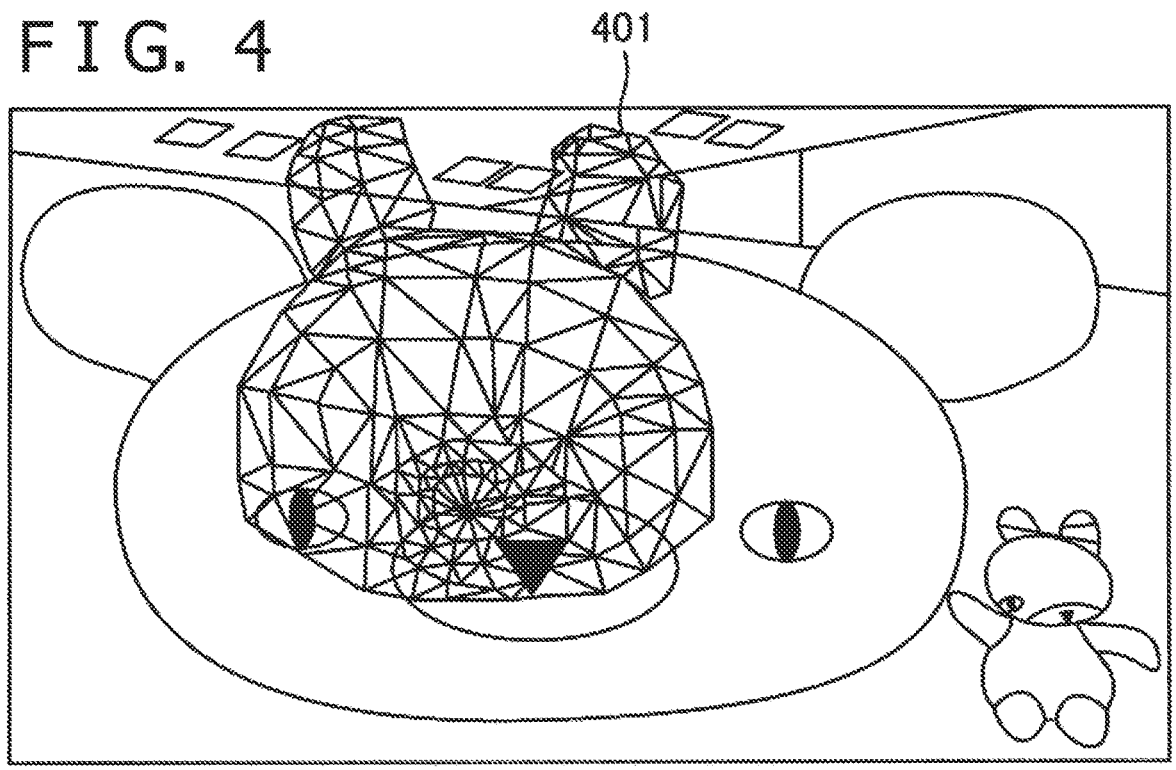
FIG. 4 is a diagram showing a typical superposed image having a wire model superposed on image information.

The superposed image information generating part 203 generates superposed image information having the wire model 401 of a polygon model (i.e., model representing the polygon model with vertexes and sides) superposed on the image represented by the acquired image information, and causes the generated information to be displayed on the display part 105. Specifically, in the initial state for example, the superposed image information generating part 203 generates the superposed image information to be superposed for display on the image in FIG. 3B, as indicated in FIG. 4. The superposed image information is displayed on the display part 105. At this point, the feature points (contour, eyes, nose, etc.) of the wire model 401 may not be aligned with those of the texture image (face portion of the stuffed toy image).

The adjustment information acquiring part 204 acquires adjustment information for aligning the texture image with the wire model 401 in position and size by enlarging or contracting the wire model 401 on the superposed image or by moving the wire model 401 as a whole, for example. As shown in FIG. 4 for example, the feature points (contour, eyes, noise, etc.) of the wire model 401 may not be aligned with those of the texture image (face portion of the stuffed toy image) in the initial state. In such a case, the user referring to the superposed image may issue adjustment instructions to move the wire model 401 in position or to enlarge or contract the wire model 401 in size. In this manner, the wire model 401 and the texture image are adjusted in position and size.

The superposed image information generating part 203 generates the superposed image information having the wire model 401 enlarged, contracted or moved in accordance with the adjustment information. The superposed image information generating part 203 causes the generated information to be displayed on the display part 105.

The mapping part 205 maps the texture image on the polygon model. Specifically, the mapping part 205 may map the texture image on the polygon model on the basis of, for example, the vertexes represented by the wire model 401 and the position of the texture image in the superposed image information following the above-described adjustment.

The mapping image information generating part 206 generates the image information having the texture image mapped on the adjusted polygon model, and causes the generated information to be displayed on the display part 105.

Here, the mapping part 205 may map the texture image on the polygon model as shown in FIG. 4 for example, on the basis of the vertexes of the wire model 401 and the position of the texture image described above. Thus in the case above, the mapping part 205 may generate mapping image information having the image information about a background not part of the face of the stuffed toy in the texture image mapped on the ear portion of the stuffed toy for example, and cause the generated information to be displayed on the display part 105. FIG. 4 shows an example that gives display of the superposed image information of which the center portion is superposed with the wire model 401 represented by its vertexes and sides, the example further showing the mapping image information representing the polygon model following the mapping in a manner smaller in size than the wire model 401 in the bottom right corner of the image. However, this example is not limitative of the embodiment. Display may obviously be given in any other suitable format. For example, the superposed image information and the mapping image information may be switched from one to the other for display according to the user's instructions.

Explained next is a typical functional structure of the control part 101 in the image processing apparatus for carrying out a vertex moving process by which the vertexes of the wire model 401 are moved for the alignment between the features of the texture image and those of the wire model 401.

Figure 5:
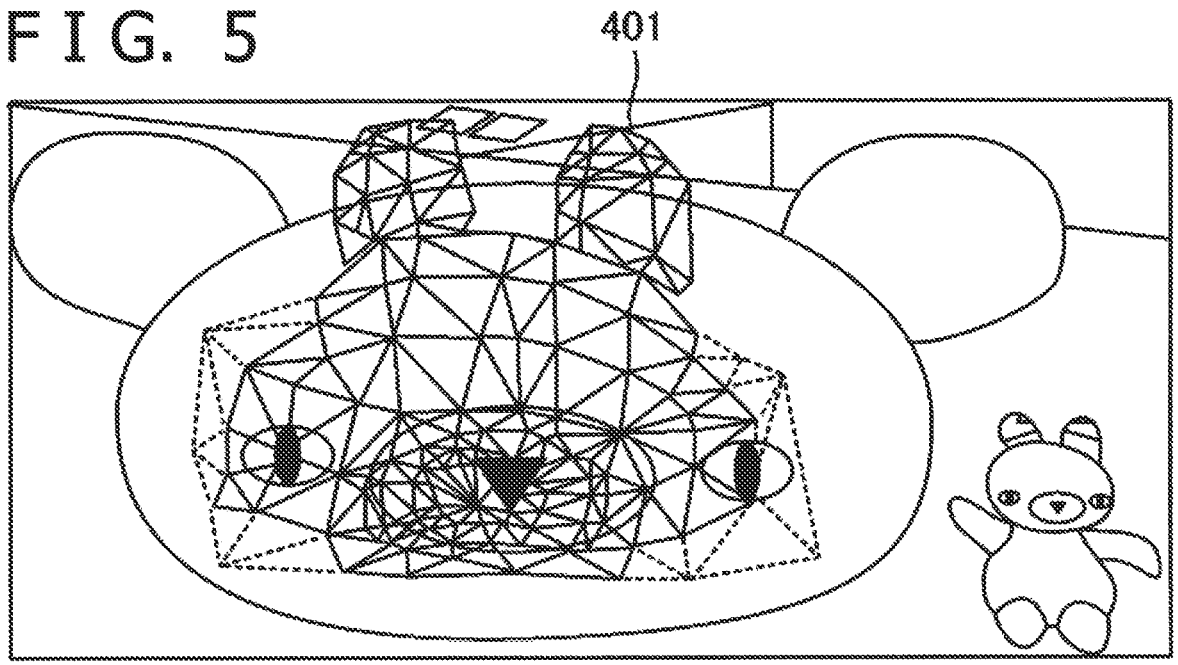
FIG. 5 is a diagram showing another typical superposed image having a wire model superposed on image information.

The vertex movement information acquiring part 207 acquires vertex movement information reflecting the position information about the vertexes moved by the user. Specifically, as shown in FIG. 5 for example, the user referring to the superposed image information may move one or multiple vertex included in the wire model 401. The vertex movement information acquiring part 207 then acquires the vertex movement information reflecting the user's instructions to move the vertexes. In FIG. 5, the moved vertexes and the sides connected to these vertexes are indicated by broken lines.

Figure 6A:
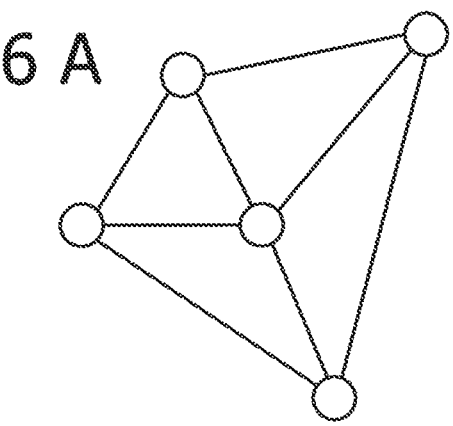
FIG. 6A is an explanatory diagram of a spring model.
Figure 6B:
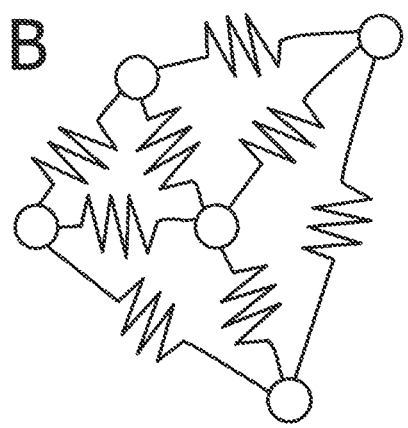
FIG. 6B is an explanatory diagram of another spring model.

The spring model applying part 208 applies a spring model to the vertexes and sides represented by polygon model information. Specifically, as shown in FIGS. 6A and 6B for example, the spring model applying part 208 may apply the so-called spring model that substitutes a mass point for the vertexes represented by the polygon model and springs for the sides represented thereby. In this spring model, the length of a given side determined by the polygon model in its initial state is assumed to be the natural length of a spring, for example. When the user moves a vertex or vertexes as described above, the lengths and the directions of the sides are changed accordingly. Forces are applied to the mass point in accordance with such changes. The mass point is moved by the total sum of the forces exerted by all the springs connected to the mass point. The movement of other vertexes by use of the spring model is carried out by the physical simulation part 209, to be discussed later. Alternatively, the natural length of each applicable spring may be arranged to be updated at a predetermined timing. Specifically, the length of a given spring in effect after the vertex movement has been carried out a predetermined number of times or at intervals of a predetermined time period may be considered to be the natural length of that spring. This makes it possible to prevent a state in which the oscillations of springs do not settle during physical simulation, to be discussed later.

Figure 7A:
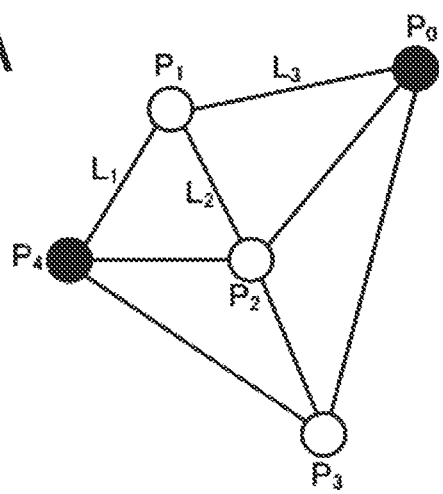
FIG. 7A is an explanatory diagram of another spring model.
Figure 7B:
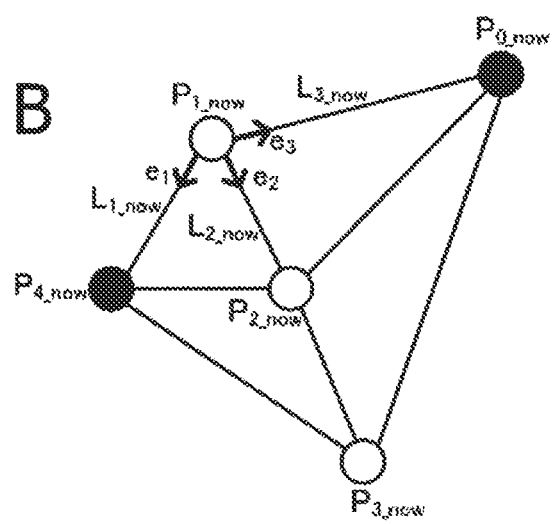
FIG. 7B is an explanatory diagram of another spring model.
Figure 7C:
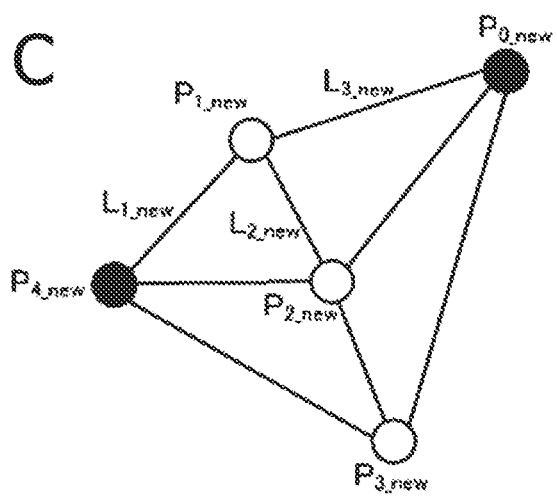
FIG. 7C is an explanatory diagram of another spring model.

The physical simulation part 209 calculates the position information about the other vertexes through physical simulation based on the vertex movement information as described above. More specific explanations of the calculations will be made with reference to FIGS. 7A through 7C. FIG. 7A shows a typical polygon model in its natural state. FIG. 7B shows a state in which a vertex P0 is moved. FIG. 7C shows a state in which other vertexes P1 through P3 are moved in keeping with the movement of the vertex P0. In FIGS. 7A through 7C, it is assumed for purpose of explanation that P4 stands for a fixed point and P1 for an editing point, i.e., the vertex of the wire model moved by the user. In this case, with P4 set to be the fixed point, P1 is subject to forces F1, F2 and F3 from the springs corresponding to the sides L1 through L3 connected to P1. In the expressions (1) through (4) given below, K stands for a spring constant and L for the length of a spring, and e1 through e3 denote unit vectors.

[Math. 1]

$$F_1 = K^*(L_{1\_now} - L_1)^* e_1 \quad (1)$$

$$F_2 = K^*(L_{2\_now} - L_2)^* e_2 \quad (2)$$

$$F_3 = K^*(L_{3\_now} - L_3)^* e_3 \quad (3)$$

$$F = F_1 + F_2 + F_3 \quad (4)$$

Here, the current position of the vertex P1 is obtained by use of the expressions (5) through (9) given below, and so are the positions of P2 and p3. When this process is repeated, the vertexes P1 through P3 settle into stable positions through a damping term. In the expressions (5) through (9), it is assumed that the unit time is 1 (omitted) and that D stands for a damping constant and M for a mass. The fixed point, mass, and the value of the damping constant are determined according to the polygon model in use. The spring model itself is well known and thus will not be discussed further.

[Math 2]

$$V = P_{1\_now} - P_{1\_old} \quad (5)$$

$$A = (P_{1\_new} - P_{1\_now}) - (P_{1\_now} - P_{1\_old}) \quad (6)$$

$$M*A = F - D*V \quad (7)$$

$$(P_{1\_new} - P_{1\_now}) - (P_{1\_now} - P_{1\_old}) = 1/M*(F - D*V) \quad (8)$$

$$P_{1\_new} = 2*P_{1\_now} - P_{1\_old} + 1/M*(F - D*V) \quad (9)$$

The polygon model information updating part 210 updates the polygon model information acquired by the polygon model information acquiring part 202, on the basis of the result of physical simulation (e.g., definitive positions of the vertexes). That is, the polygon model information updating part 210 updates the polygon model information in accordance with the positions of the vertexes following the physical simulation.

The superposed image information generating part 203 generates the superposed image information having the updated polygon model superposed on the image information, and causes the generated information to be displayed on the display part 105. Here, as shown in the center portion of FIG. 5 for example, the superposed image information generating part 203 may be arranged to identify on display those vertexes of the wire model 401 which have been moved according to the user's instructions together with the sides connected to these vertexes. Furthermore, the superposed image information generating part 203 may be arranged to also identify on display the vertexes of which the positions have been moved over distances longer than a predetermined distance through physical simulation (i.e., vertexes other than those moved as per instructions).

The mapping part 205 maps the texture image on the polygon model represented by the updated polygon model information. The mapping image information generating part 206 generates mapping image information for displaying a polygon model having a texture image mapped on the polygon model represented by the updated polygon model information, and causes the generated information to be displayed on the display part 105. In this case, as shown in the bottom right corner of FIG. 5, the vertexes corresponding to the feature points (contour, eyes, nose) of the polygon model are better aligned with the feature points of the texture image (stuffed toy) than in the case of FIG. 3. Thus it can be seen that the feature points (contour, eyes, nose) of the polygon model following the mapping are arranged in more preferable positions than in the case of FIG. 3.

Figure 8:
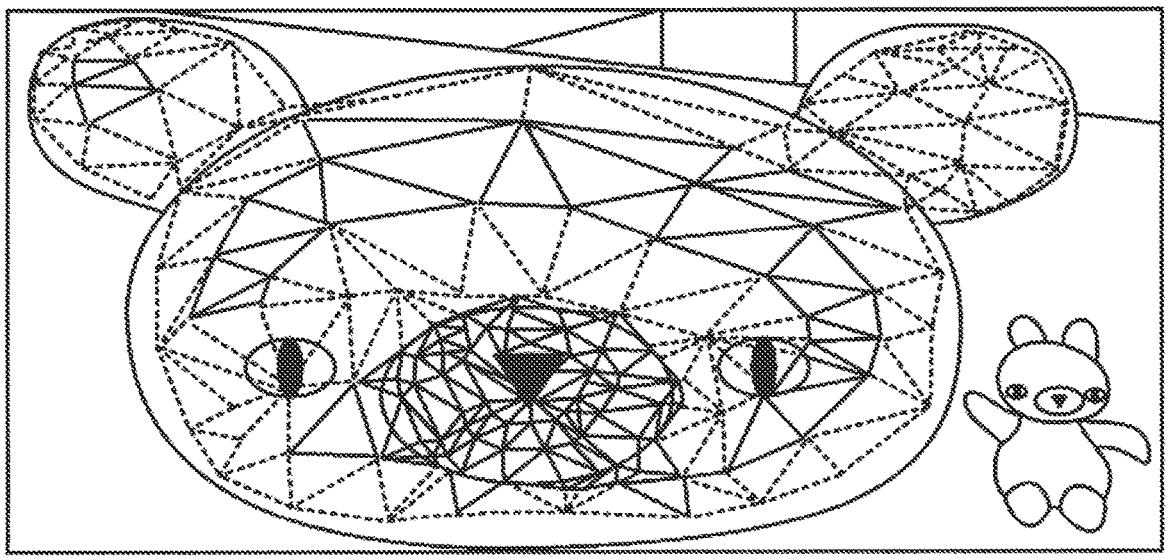
FIG. 8 is a diagram showing a typical superposed image having a wire model superposed on image information.

The adjusting process by which the texture image and wire model 401 are aligned in position and size, and the vertex moving process by which the vertexes of the wire model 401 are moved to align the feature points of the texture image with those of the wire model 401 are carried out as described above until the user obtains mapping image information as desired. This is how the user obtains the desired mapping image information. FIG. 8 shows examples of superposed image information and mapping image information in effect when the desired mapping image information is acquired as described above. As shown in FIG. 8, after the vertexes have been moved to appropriate positions by the vertex moving process, the texture image can be seen mapped in a more preferable manner than before with regard to the eyes, nose, ears, etc., of the polygon model. In FIG. 8, as in FIG. 5, the moved vertexes and the sides connected to these vertexes are indicated by broken lines.

With this embodiment, as explained above, when some of the vertexes are moved by the vertex moving process, other related vertexes in the spring model are also moved in keeping with the moved vertexes. In this manner, the user can obtain the desired mapping image information by issuing fewer instructions to move vertexes than before while reducing deformations or other irregularities caused by errors during the vertex moving process. It should be noted that the above-described functional structure of the image processing apparatus 100 is only an example and is not limitative of this embodiment. Any other different structure may be adopted as long as it provides the same or equivalent effects.

Figure 9:
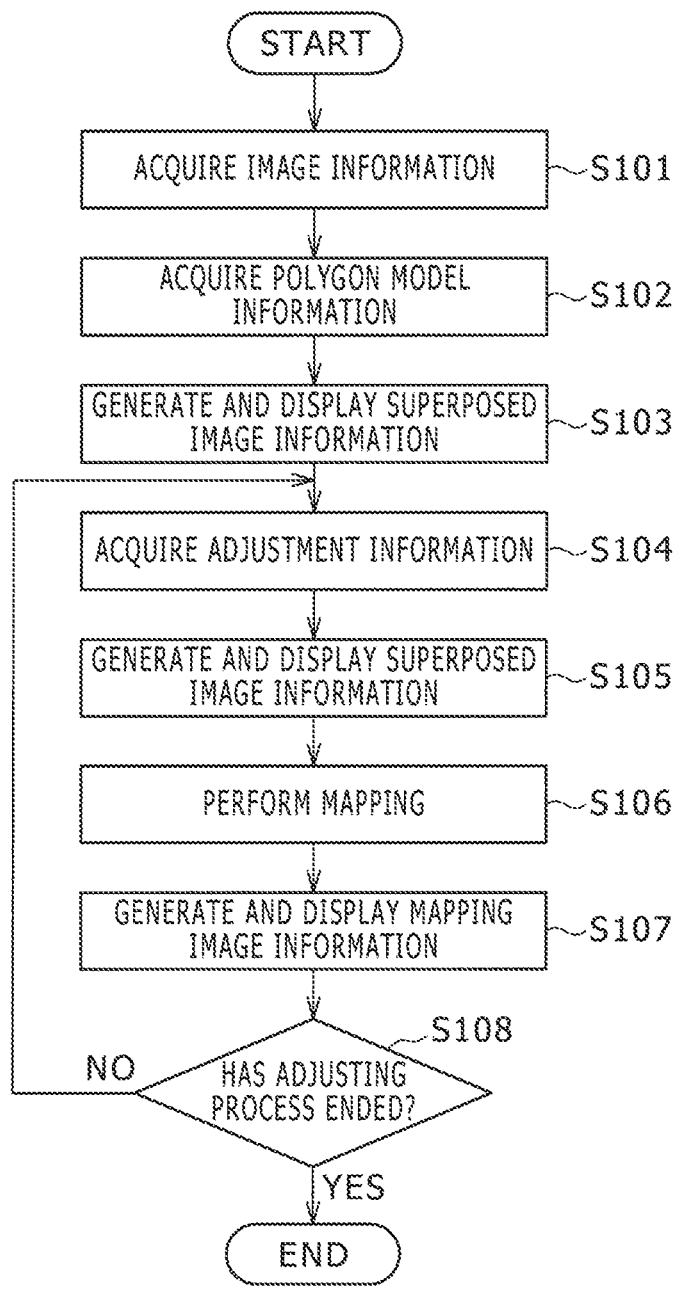
FIG. 9 is a diagram showing a typical flow of an adjusting process.

Explained next are typical overall flows of processing performed by the image processing apparatus 100. First to be explained is the flow of an adjusting process by which the texture image and the polygon model are aligned with each other in position and size. FIG. 9 outlines a typical flow of the adjusting process.

The image information acquiring part 201 acquires two-dimensional image information including the texture image to be mapped on the polygon model (S101). The polygon model information acquiring part 202 acquires the polygon model information representing the polygon model (S102). The superposed image information generating part 203 generates the superposed image information having the wire model 401 of the polygon model superposed on the image represented by the acquired image information, and causes the generated information to be displayed on the display part 105 (S103).

The adjustment information acquiring part 204 acquires adjustment information for aligning the texture image with the wire model 401 in position and size by enlarging the wire model 401 in the superposed image or by moving the entire wire model 401, for example (S104). The superposed image information generating part 203 generates the superposed image information having the wire model 401 as a whole enlarged and/or moved in accordance with the adjustment information, and causes the generated information to be displayed on the display part 105 (S105).

The mapping part 205 maps the texture image on the polygon model (S106). The mapping image information generating part 206 generates the image information having the texture image mapped on the adjusted polygon model, and causes the generated information to be displayed on the display part 105 (S107).

It is then determined whether or not the adjusting process has ended (S108). Specifically, the determination is made by determining whether or not the adjustment information acquiring part 204 has acquired from the user an instruction to terminate the adjusting process. If it is determined that the adjusting process is instructed to be terminated, the adjusting process is brought to an end. On the other hand, if it is determined that the adjusting process has yet to be terminated, step S104 is reached again. That is, the adjusting process is repeated in which the user may again issue the instruction to move the entire wire model 401, for example.

Figure 10:
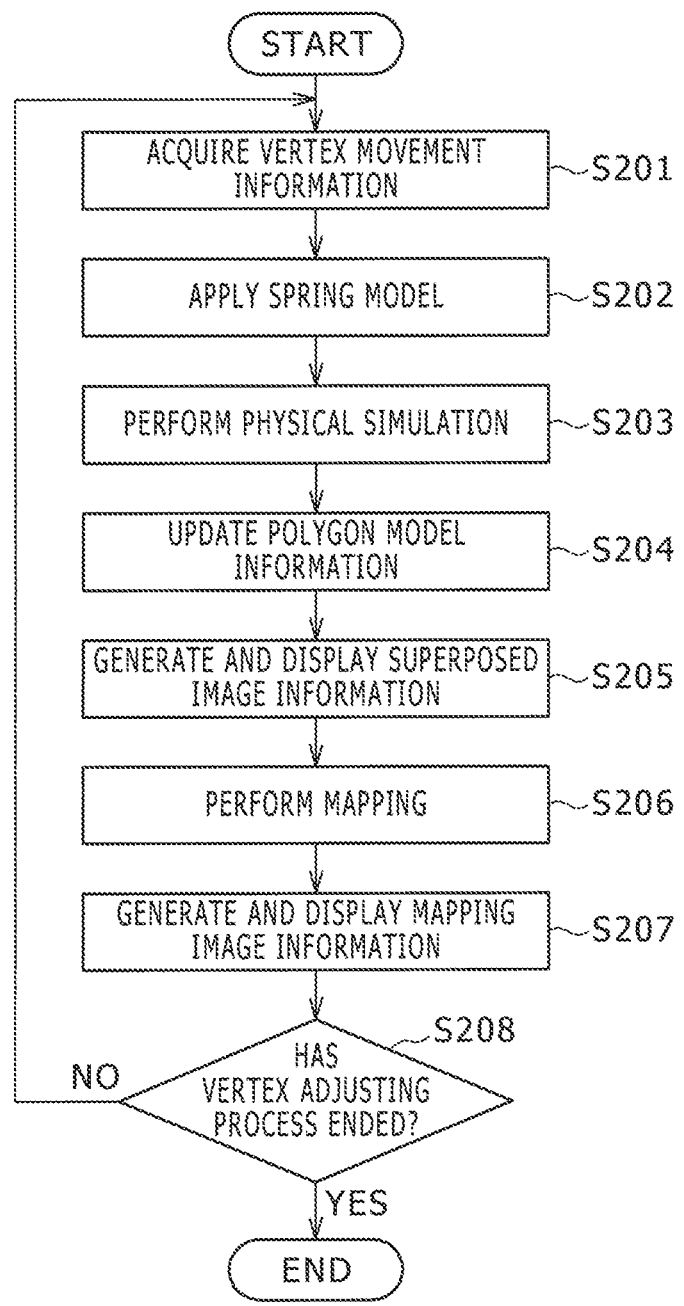
FIG. 10 is a diagram showing a typical flow of a vertex moving process.

Next to be explained is a typical overall flow of the vertex moving process performed by this embodiment. FIG. 10 outlines a typical flow of the vertex moving process carried out by the embodiment.

As shown in FIG. 10, the vertex movement information acquiring part 207 acquires the vertex movement information corresponding to the position information about the vertexes moved by the user referencing the superposed image information (S201). The spring model applying part 208 applies a spring model to the vertexes and sides represented by the polygon model information (S202). The physical simulation part 209 performs physical simulation based on the above-described vertex movement information to calculate the position information about the other vertexes (S203).

The polygon model information updating part 210 updates the polygon model information based on the result of the physical simulation (S204). The superposed image information generating part 203 generates the superposed image information having the updated polygon model superposed on the texture image, and causes the generated information to be displayed on the display part 105 (S205).

The mapping part 205 maps the texture image on the polygon model represented by the updated polygon model information (S206). The mapping image information generating part 206 generates mapping image information for displaying the polygon model having the texture image mapped on the polygon model represented by the updated polygon model information, and causes the generated information to be displayed on the display part 105 (S207).

It is then determined whether or not the vertex moving process has ended (S208). Specifically, the determination is made by determining whether or not the vertex movement information acquiring part 207 has acquired from the user an instruction to terminate the vertex moving process. If it is determined that the vertex moving process is instructed to be terminated, the process is brought to an end. On the other hand, if it is determined that the vertex moving process has yet to be terminated, step S201 is reached again. In this case, the vertex moving process is repeated in which the user may again move the same or other vertexes, for example.

It should be noted that the above-described flows of the adjusting process and of the vertex moving process are only examples and are not limitative of this embodiment. For example, although the adjusting process and the vertex moving process were discussed separately above for ease of understanding, obviously arrangements can be made to perform the vertex moving process while carrying out the adjusting process at the same time.

It should be noted that the above-described first embodiment is not limitative of the present disclosure and that the embodiment may be replaced with a structure that is substantially the same as that of the embodiment above, a structure providing the same effects, or a structure attaining the same objects as those achieved by the above-described embodiment.

For example, where the number of the vertexes and that of the sides of a polygon model are larger than predetermined numbers, the vertex moving process may be performed using a thinned-out wire model 401 obtained by subtracting a predetermined number of vertexes from the original wire model. Alternatively, wire models 401 from which a predetermined number of vertexes have been subtracted each may be prepared hierarchically. After an upper-layer wire model 401 is subjected to the vertex moving process, the vertexes of that wire model may be fixed. A lower-layer wire model 401 may then be subjected to the vertex moving process. In this manner, the user can perform the vertex moving process more easily than before. Specifically, it is possible to reduce the number of times the user issues the instruction to move vertexes. As another alternative, physical simulation may be arranged to deal with each thinned-out wire model 401 obtained by subtracting the predetermined number of vertexes from the original wire model. This makes it possible to alleviate the load on the physical simulation and contributes to shortening the processing time involved.

Although it was explained above that the user performs the adjusting process, it is also possible to extract the contour of the face region or like portion of the image using image processing technology so as to provide a wire model 401 having the position and size corresponding to the extracted contour.

As another alternative, whereas the vertex moving process and the adjusting process are carried out as described above, arrangements may be made to perform a texture image deforming process (e.g., a process by which the texture image is enlarged, contracted, or changed in aspect ratio) as well.

Furthermore, if the image processing apparatus 100 above is constituted by a system of structures, the functional structure of the apparatus 100 may be distributed to different structures. For example, where the image processing apparatus 100 is formed by a server-client system, the functional structure of the apparatus 100 may be implemented partially or entirely on the side of the server, with the user utilizing a client to input the vertex movement information and adjustment information or perform some other input.

Second Embodiment

Figure 11:
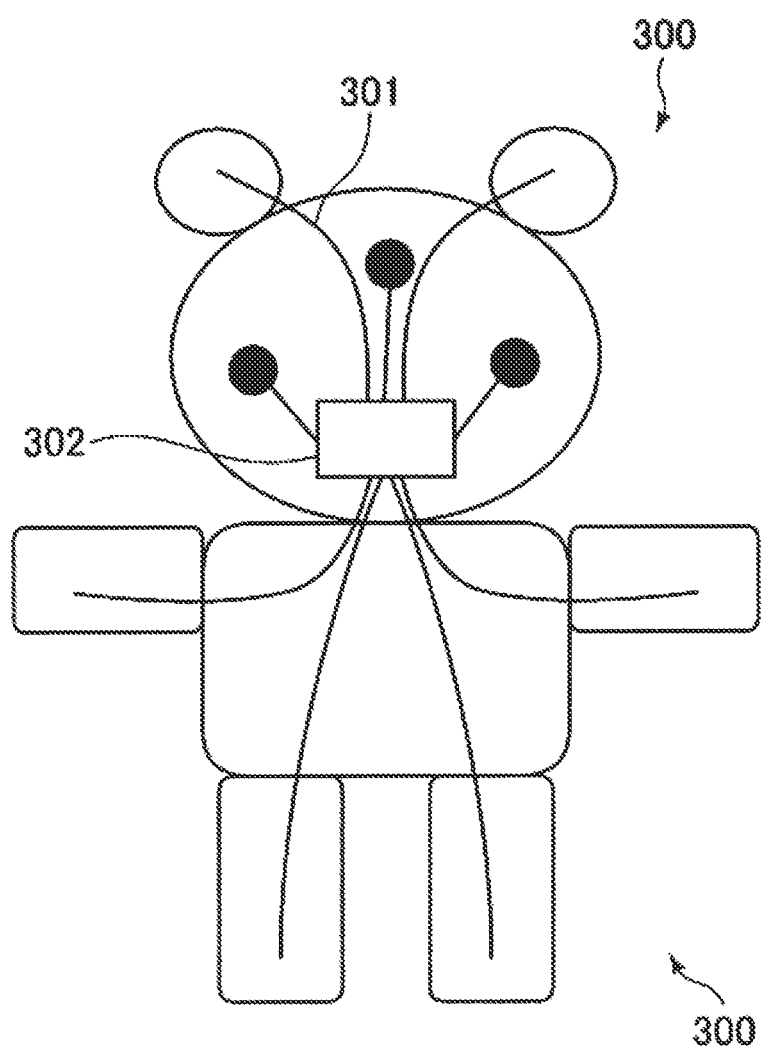
FIG. 11 is a diagram showing a typical character-type controller as a second embodiment of the present disclosure.

A second embodiment of the present disclosure is explained below. FIG. 11 is an explanatory diagram outlining a typical character-type controller as the second embodiment of the present disclosure.

As shown in FIG. 11, a character-type controller 300 as the second embodiment may be shaped to represent a video game character or like entity (e.g., stuffed toy), the character having its various portions (e.g., ears, hands, feet, body, mouth, eyes) equipped internally with various sensors 301 including an acceleration sensor, an angular velocity sensor, a pressure sensor, a geomagnetic sensor, a bending sensor, and an acoustic sensor, along with a control part 302. The control part 302 controls these sensors 301. Also, the control part 302 acquires outputs from the sensors 301 and forwards the acquired outputs to an information processing apparatus (e.g., a game console or a server, not shown) connected to the controller 300.

The information processing apparatus then takes in the specifics of the operation instructions on the basis of the outputs from the sensors 301. Specifically, the information processing apparatus may detect the strength and position of applied pressure from the pressure sensor, and figure out how the apparatus is being touched (e.g., whether or not the apparatus is simply pressed or is being chafed) from the acoustic sensor, for example. In this case, the user can input the operation of, say, chafing a specific position of the stuffed toy during the game by actually giving friction to the corresponding position of the controller 300 shaped as the stuffed toy.

In beat'-em-up games, for example, there are conceivably cases where a specific portion of the opposing character is designated (e.g., legs are designated for an attack). In such cases, the controller 300 of this embodiment may be shaped to resemble the opposing character (e.g., a humanoid shape if the opposing character is a person), and the above-mentioned various sensors 301 may be incorporated in the controller 300. For example, the user may actually press a specific portion of the controller 300 to launch an attack or perform other action on that specific portion of the opposing character during the game. Specifically, game consoles or similar controllers usually include buttons for designating the operating direction and buttons for effecting the tilting operation, for example. Since the user's actions on the controller are primarily composed of pushing its buttons and tilting its levers, it is difficult for the controller to designate a specific portion of a character in a game or to identify the type of the action (e.g., to stroke). However, the second embodiment of the present disclosure allows the user to designate a character's specific portion and to input the type of the action more directly than before so that such designation and input can be identified by the controller. It should be noted that the layout of the sensors 301 shown in FIG. 11 is only an example and is not limitative of the embodiment. The shape of the controller 300 and the types and locations of the sensors 301 are also examples; these can obviously be modified as desired depending on the target to be manipulated in games, for example.

It should be noted that the above-described second embodiment is not limitative of the present disclosure and that the embodiment may be replaced with a structure that is substantially the same as that of the embodiment above, a structure providing the same effects, or a structure attaining the same objects as those achieved by the above-described embodiment.

The present disclosure contains subject matter related to that disclosed in Japanese Priority Patent Application JP 2014-221998 filed in the Japan Patent Office on Oct. 30, 2014, the entire content of which is hereby incorporated by reference.

What is claimed is:

1. An image processing apparatus comprising:
an input device;
an image information acquiring part configured to acquire two-dimensional image information including a texture image;
a polygon model information acquiring part configured to acquire polygon model information representing a three-dimensional polygon model as an object on which to map the texture image, the polygon model information including position information about a plurality of vertexes,
wherein the plurality of vertexes are arranged into an upper layer model and a lower layer model;
an adjustment information acquiring part for acquiring adjustment information instructions from a user using the input device, wherein the adjustment information instructions include instructions to move one or more of the vertexes of the polygon model,
wherein a first instruction to move a first vertex also moves at least one other vertex not specified by the first instruction, and
wherein a second instruction to move a second vertex in the lower layer model causes all the vertexes in the upper layer to remain at fixed positions;
a polygon model information updating part configured to update the position information about at least one and other vertexes included in the polygon model information, on a basis of predetermined relations reflecting vertex movement information acquired from the adjustment information instructions; and
a mapping part configured to map the texture image after each adjustment information instruction inputted by the user on the polygon model based on the updated polygon model information,
wherein the mapping part is ended by a user instruction.

2. The image processing apparatus according to claim 1, wherein the predetermined relations reflect a spring model having a virtual spring provided for each of the sides connecting the vertexes; and
the image processing apparatus further comprises
a physical simulation part configured to perform physical simulation based on the spring model and on the vertex movement information.

3. The information processing apparatus according to claim 2, further comprising
a spring model updating part configured to update a natural length of each of the springs at a predetermined timing.

4. The information processing apparatus according to claim 2, further comprising
a superposed image information generating part configured to generate superposed image information for displaying a wire model representing the vertexes and the sides of the polygon model in a manner superposed on the image information, on a basis of the polygon model information.

5. The information processing apparatus according to claim 4, wherein the superposed image information generating part generates the superposed image information for displaying in a superposed manner the wire model representing a portion of the vertexes and of the sides included in the polygon model.

6. The information processing apparatus according to claim 5, wherein the physical simulation part performs the physical simulation using the portion of the vertexes and of the sides.

7. An image processing method comprising:
acquiring two-dimensional image information including a texture image;
acquiring polygon model information representing a three-dimensional polygon model as an object on which to map the texture image, the polygon model information including position information about a plurality of vertexes,
wherein the plurality of vertexes are arranged into an upper layer model and a lower layer model;
acquiring adjustment information instructions from a user using an input device, wherein the adjustment information instructions include instructions to move one or more of the vertexes of the polygon model,
wherein a first instruction to move a first vertex also moves at least one other vertex not specified by the first instruction,
wherein a second instruction to move a second vertex in the lower layer model causes all the vertexes in the upper layer to remain at fixed positions;
updating the position information about at least one and other vertexes included in the polygon model information, on the basis of predetermined relations reflecting vertex movement information acquired from the adjustment information instruction;
mapping the texture image on the polygon model based on the updated polygon model information; and
ending the mapping when a user instruction is received.

8. A non-transitory computer readable medium having stored thereon an image processing program for causing a computer to function as an apparatus, the program comprising: an image information acquiring part configured to acquire two-dimensional image information including a texture image; a polygon model information acquiring part configured to acquire polygon model information representing a three-dimensional polygon model as an object on which to map the texture image, the polygon model information including position information about a plurality of vertexes, wherein the plurality of vertexes are arranged into an upper layer model and a lower layer model; an adjustment information acquiring part for acquiring adjustment information instructions from a user using an input device in communication with the computer, wherein the adjustment information instructions include instructions to move one or more of the vertexes of the polygon model, wherein a first instruction to move a first vertex also moves at least one other vertex not specified by the first instruction, wherein a second instruction to move a second vertex in the lower layer model causes all the vertexes in the upper layer to remain at fixed positions; a polygon model information updating part configured to update the position information about at least one and other vertexes included in the polygon model information, on a basis of predetermined relations reflecting vertex movement information acquired from the adjustment information instructions; and a mapping part configured to map the texture image on the polygon model based on the updated polygon model information, wherein the mapping part is ended by a user instruction.

\* \* \* \* \*